(12) United States Patent
Schmidt et al.

(10) Patent No.: US 8,332,005 B2
(45) Date of Patent: Dec. 11, 2012

(54) SUPERCONDUCTING ELECTRICAL CABLE

(75) Inventors: Frank Schmidt, Langenhagen (DE);
Rainer Solka, Hannover (DE)

(73) Assignee: Nexans, Paris (FR)

( * ) Notice: Subject to any disclaimer, the term of this patent is extended or adjusted under 35 U.S.C. 154(b) by 1060 days.

(21) Appl. No.: 12/288,452

(22) Filed: Oct. 20, 2008

(65) Prior Publication Data

US 2009/0131261 A1    May 21, 2009

(30) Foreign Application Priority Data

Oct. 19, 2007    (EP) .................................... 07291278

(51) Int. Cl.
*H01B 12/02*    (2006.01)
*H01B 12/00*    (2006.01)

(52) U.S. Cl. ........ 505/231; 505/163; 505/230; 505/704; 174/125.1

(58) Field of Classification Search .................. 505/163, 505/230–232, 430–431, 704, 741; 174/125.1, 174/15.4, 15.5; 29/599
See application file for complete search history.

(56) References Cited

U.S. PATENT DOCUMENTS

| 3,749,811 | A  | * | 7/1973 | Bogner et al. | ............... 174/15.5 |
| 2004/0266628 | A1 | * | 12/2004 | Lee et al. | ...................... 505/238 |
| 2005/0068701 | A1 | * | 3/2005 | Lee et al. | ........................ 361/19 |
| 2007/0029104 | A1 | * | 2/2007 | Allais et al. | ................ 174/125.1 |
| 2008/0191561 | A1 | * | 8/2008 | Folts et al. | ..................... 307/147 |

FOREIGN PATENT DOCUMENTS

| DE | EP 1717821 A1 | * | 11/2006 |
| EP | 1717821 |  | 11/2006 |

* cited by examiner

*Primary Examiner* — Stanley Silverman
*Assistant Examiner* — Kallambella Vijayakumar
(74) *Attorney, Agent, or Firm* — Sofer & Haroun, LLP

(57) ABSTRACT

A superconducting electrical cable is specified, which is surrounded by a cryostat (3), which comprises two concentric metallic tubes (4, 5) which enclose thermal insulation between them and is used to carry a cooling medium. The cable has at least one superconductor (1), which is composed of superconducting material, as well as a normal electrical conductor (7), which is composed of normally conductive material and is electrically conductively connected to the superconductor. The normal conductor (7) is arranged outside of but resting on the cryostat (3).

1 Claim, 1 Drawing Sheet

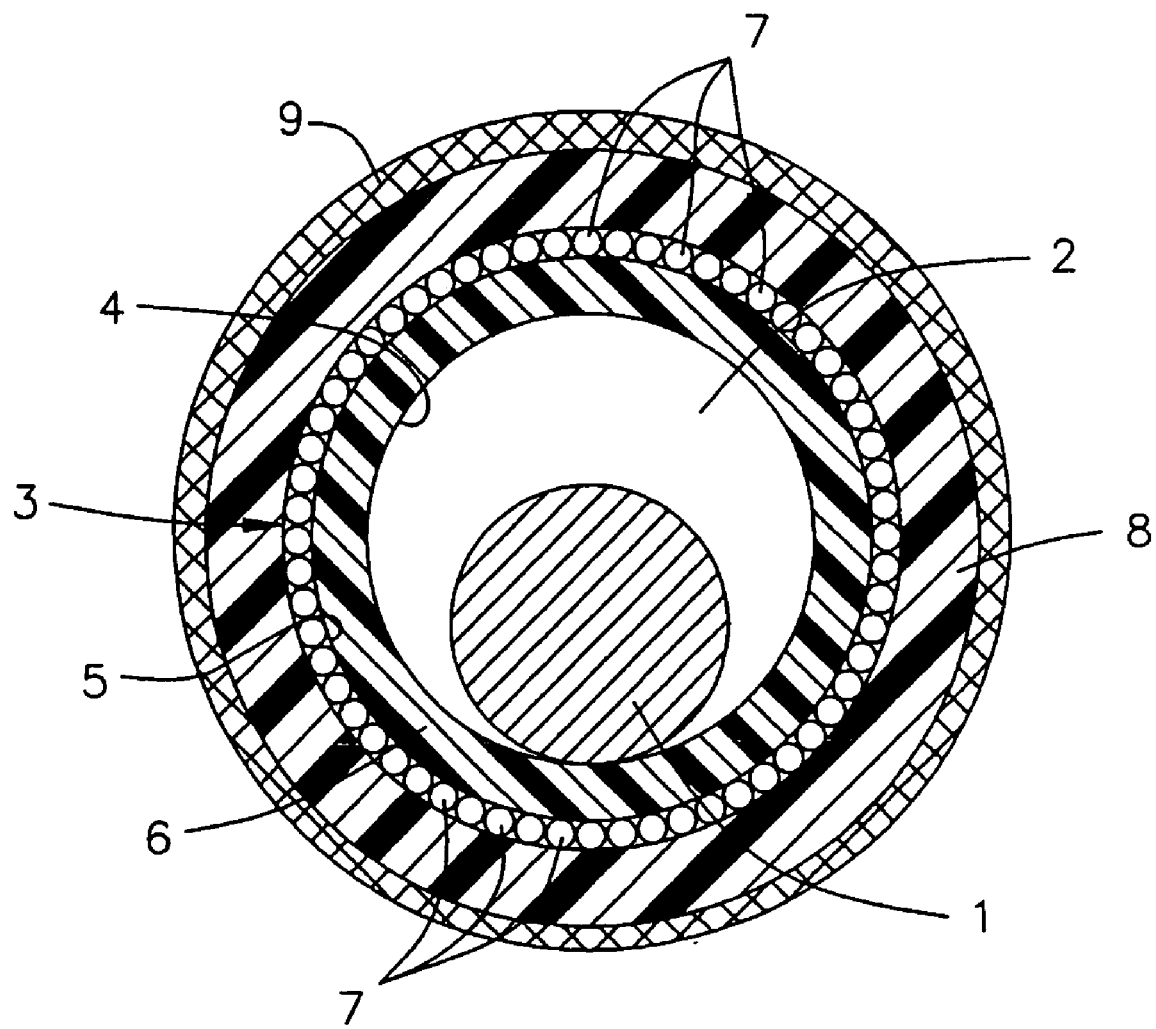

SUPERCONDUCTING ELECTRICAL CABLE

RELATED APPLICATION

This application claims the benefit of priority from European Patent Application No. 07291278.5, filed on Oct. 19, 2007, the entirety of which is incorporated by reference.

FIELD OF THE INVENTION

The invention relates to a superconducting electrical cable which is surrounded by a cryostat, which comprises two concentric metallic tubes which enclose thermal insulation between them and is used to carry a cooling medium, and which superconducting electrical cable has at least one superconductor, which is composed of superconducting material, as well as a normal electrical conductor, which is composed of normally conductive material and is electrically conductively connected to the superconductor (EP 1 717 821 A1)

BACKGROUND

A superconducting cable has at least one electrical conductor composed of a specific material which changes to the superconducting state at sufficiently low temperatures. The electrical resistance of a correspondingly designed conductor thus tends to zero. Suitable materials are, for example, YBCO (yttrium-barium-copper-oxide) or BiSCCO (bismuth-strontium-calcium-copper-oxide) By way of example, sufficiently low temperatures for a material such as this are between 4 K and 110 K, in order to achieve the superconducting state. Suitable coolants are, for example, nitrogen, helium, neon and hydrogen or mixtures of these substances, in each case in a gaseous or liquid state. Superconducting cables with a cold dielectric and with a warm dielectric are known.

In a superconducting cable with a cold dielectric, the superconducting conductor is surrounded by a dielectric which is composed of layers of insulating material and in which the dielectric contains a liquid cooling medium as an impregnation means. A cable such as this comprises, for example, the conductor as an inner conductor and a screen or return conductor, which is arranged concentrically with respect to the inner conductor, which conductors are kept isolated from one another and at a distance from one another by the dielectric (insulation). A corresponding cable is surrounded by a cryostat which carries a coolant and comprises two concentric metallic tubes which are insulated from one another by thermal insulation.

The cable according to EP 1 717 821 A1 as described initially is a superconducting cable with a warm dielectric, in which the superconducting conductor is arranged directly in a cryostat which carries the coolant. The dielectric or the insulation and the screen, which can also be used as a return conductor, are in this case fitted over the cryostat. This known cable is also equipped with a normal conductor, which is composed of normally conductive material, such as copper, and, for example, carries the current in the event of failure of the cooling or in the event of a short circuit. In the event of a short circuit, the energy that is introduced is dissipated via the coolant. In order to achieve a good current distribution in this cable, specific conductor geometries, in particular specific twist angles, are required both for the superconducting conductor and for the normal conductor.

OBJECTS AND SUMMARY

The invention is based on the object of simplifying the design of the initially described cable.

According to the invention, this object is achieved in that the normal conductor is arranged outside of but resting on the cryostat.

In this cable, the normal conductor is located outside the cryostat and is therefore at room temperature, and in consequence, in particular, is outside the cryogenic area that acts during operation of the cable. Only the superconducting conductor is located in the cryostat, thus resulting in more options being available for its geometric design, without considering the normal conductor. Energy which is introduced in the event of a short circuit also does not load the cooling system within the cryostat. This energy is introduced at room temperature outside the cooling system, and can be dissipated using conventional means.

BRIEF DESCRIPTION OF THE DRAWINGS

One exemplary embodiment of the subject matter of the invention is illustrated in the drawing The single FIGURE of the drawing shows a cross section through a cable according to the invention.

DETAILED DESCRIPTION

The superconducting cable is in the form of a single-phase cable. It has a conductor 1 composed of superconducting material of any desired design, which is arranged in a cryostat 3, with a free space 2 passing through it. The cryostat 3 comprises two concentric metallic tubes 4 and 5 which are separate from one another by an annular space 6 in which thermal insulation is located. A coolant, for example liquid nitrogen, is passed through the cryostat 3 in order to cool the superconducting conductor 1.

A normal conductor 7 is arranged outside the cryostat 2 and rests on the cryostat 3, or on its outer tube 5. It is electrically conductively connected both to the conductor 1 and to the cryostat 3, so that these parts are at the same electrical potential.

The normal conductor 7 is advantageously composed of copper or aluminium. It is formed from a multiplicity of individual wires, at least one layer of which advantageously rests on the outer tube 5 of the cryostat 3, distributed over the circumference of the latter. The individual wires of the normal conductor 7 may have a round cross section, corresponding to that illustrated in the drawing. However, they may also be rectangular. The number of individual wires of the normal conductor 7 is governed by its cross section. They need not be arranged uniformly and completely around the tube 5 of the cryostat 3, The individual wires may also be fitted at two or more points on the circumference of the tube 5, in each case with a separation.

The insulation 8 of the cable is arranged as a dielectric over the normal conductor 7, and is advantageously composed of crosslinked polyethylene. This is extruded around the cryostat 3 to which the normal conductor 7 has been fitted. The insulation 8 is surrounded by an electrical screen 9. The screen 9 may be in the form of a metallic tube, but may also be corrugated transversely with respect to its longitudinal direction.

What is claimed is:
1. Superconducting electrical cable which is surrounded by a cryostat, which comprises:
   two concentric metallic tubes which enclose thermal insulation between them and is used to carry a cooling medium, and which superconducting electrical cable has at least one superconductor, which is composed of superconducting material, as well as a normal electrical conductor, which is composed of normally conductive material and is electrically conductively connected to the superconductor,
wherein the normal conductor is arranged outside of, but resting on, the cryostat and wherein the normal conductor is made from a multiplicity of individual wires which are distributed around the circumference of the cryostat.

* * * * *